(12) United States Patent
Tomak

(10) Patent No.: US 8,484,094 B2
(45) Date of Patent: *Jul. 9, 2013

(54) SYSTEM AND METHOD FOR A DATA DRIVEN META-AUCTION MECHANISM FOR SPONSORED SEARCH

(75) Inventor: Kerem Tomak, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/561,179

(22) Filed: Jul. 30, 2012

(65) Prior Publication Data

US 2012/0290406 A1    Nov. 15, 2012

Related U.S. Application Data

(62) Division of application No. 12/338,460, filed on Dec. 18, 2008, now Pat. No. 8,260,680.

(51) Int. Cl.
    *G06Q 40/00*    (2012.01)
(52) U.S. Cl.
    USPC ............................................ 705/26.3; 705/35

(58) Field of Classification Search
    USPC .................................................. 705/26, 26.3
    See application file for complete search history.

(56) References Cited

U.S. PATENT DOCUMENTS

| | | | |
|---|---|---|---|
| 7,627,514 B2 | 12/2009 | Guier et al. | |
| 2006/0167784 A1* | 7/2006 | Hoffberg | 705/37 |
| 2009/0043649 A1* | 2/2009 | Wright et al. | 705/14 |

* cited by examiner

*Primary Examiner* — James Vezeris
(74) *Attorney, Agent, or Firm* — DENTONS US LLP

(57) ABSTRACT

Apparatuses, methods, and systems directed to deriving optimal parameters of a learning algorithm to maximize an objective function of online keyword auctions for bidded terms. Some embodiments of the invention simulate online keyword auctions based on historical data for the bidded terms, wherein the parameters of the simulated auctions such as market reserve prices of the bidded terms are determined by an adaptive learning algorithm. The values of the parameters of the learning algorithm are optimized by a stochastic optimization method to maximize an objective function for the auctions of the bidded terms.

11 Claims, 5 Drawing Sheets

SYSTEM AND METHOD FOR A DATA DRIVEN META-AUCTION MECHANISM FOR SPONSORED SEARCH

RELATED APPLICATION DATA

This application is a division of U.S. patent application Ser. No. 12/338,460, filed on Dec. 18, 2008, now US. Pat. No. 8,250,680 the entirety of which is incorporated herein by reference to the extent permitted by law.

TECHNICAL FIELD

The present disclosure relates to determining optimal parameters of adaptive learning algorithms used in online keyword auctions.

BACKGROUND

Internet search engines widely use online keyword auctions to sell advertising spaces on search results pages. In a typical online keyword auction, participating advertisers bid on certain terms for their advertisements. Each term comprises one or more keywords. When a query submitted to an Internet search engine partially or completely matches a bidded term, the advertisements from participating advertisers may be listed along with the search results of the query. The advertisements are usually displayed in certain advertising spaces on a Web page. When the Web page is a search results page of a query, the advertising spaces are typically on the top, bottom, left, or right hand side of the search results page. The advertisements are usually ordered by the amount of the bid and the relevance of the advertisement to the query. The advertisers are only charged when the advertisement is clicked on, presumably by a human being. This type of advertising service provided by the Internet search engines is often referred to as Pay-Per-Click (PPC) advertising or Sponsored Search, which is different from the traditional impression based accounting for advertisements. Traditionally, advertisers are charged by the number of impressions an advertisement is shown to a target audience. PPC advertising gives more visibility to advertisers as to who may be interested in the advertisements and who may ultimately enter a transaction to purchase the advertised products or services. Therefore, PPC advertisers are willing to bid on certain keywords in an online auction to more precisely target advertising audiences. As a result, online keyword auctions have generated significant revenue for the Internet search engines.

The number of online keyword auctions conducted on a daily basis at the major Internet search engines is on the order of hundreds of millions. The revenue generated by the auctions may reach tens of billions of dollars per year for the Internet search engines. Consequently, the online keyword auction has attracted considerable attention from practitioners as well as academics. One research area involves designing an optimal auction mechanism and finding optimal market reserve prices for the keywords in an online auction. A market reserve price is a minimum bid for a bidded term comprising one or more keywords. There is no sale if the bids are below the market reserve price. Most auction mechanism designs make certain assumptions about bidders for the keywords. In general, assumptions are often made about the value distribution and the rationality of the bidders. The value distribution refers to a range of values a bidder has for the bidded term in the auctions. The bidder submits higher and higher bids to compete for the bidded term until the current bid is over the bidder's value range for the bidded term. The rationality refers to the bidders' rationality in a bidding process. In empirical studies, one particular form of bidder irrationality called loss aversion has been observed. A bidder considers that it is "losing" an item when it was the high bidder at one time during the bidding process. Such a loss averse bidder may bid more aggressively after having had the highest bid at any point in the bidding process but was later outbidded by another bidder.

The goal of an auctioneer of online keyword auctions is to find the auction parameters that result in a maximum value of an objective function for the keyword auctions. The objective function often is the expected revenue from the keyword auctions. In order to mathematically model the online keyword auctions, bidders and their behaviors often have to be simulated based on recorded data from past auctions of the same or similar keywords. The behavior of bidders, however, differs for different keywords at different times. To adapt to the ever changing characteristics of the bidders, auctioneers often use adaptive learning algorithms to revise the auction parameters such as the market reserve prices of the keywords in response to observed results of previous auctions. The learning algorithms themselves are often parameterized. The optimal values of the learning parameters of these algorithms will have to be determined so that the learning algorithms may be able to quickly find the optimal auction parameters for the online keyword auctions.

SUMMARY

The present invention provides apparatuses, methods, and systems directed to deriving optimal parameters for a learning algorithm to maximize an objective function of online keyword auctions. Some embodiments of the invention simulate online keyword auctions based on historical data for the bidded terms, wherein the market reserve prices of the bidded terms are determined by an adaptive learning algorithm with one or more learning parameters. A stochastic optimization method finds the values of the learning parameters that maximize an objective function for the auctions of the bidded terms. In some embodiments, the objective function comprises an overall estimated revenue from the auctions. In other embodiments, an online auction platform receives a bidded term and the bids, calculates the optimal market reserve price of the bidded term, decides whether to accept the bid, outputs the market reserve price for display if the bid is below the calculated market reserve price, and receives additional bids. The market reserve prices of the bidded terms are calculated by an adaptive learning algorithm. The values of the parameters of the adaptive learning algorithm are determined by a stochastic optimization process in simulated auctions.

In one embodiment of the present invention, the apparatuses and methods are directed to an optimization process that determines optimal parameters for an adaptive learning algorithm based on historical data related to the online auctions of one or more bidded terms. In some embodiments, the optimization process comprises a simultaneous perturbation stochastic approximation process.

In other embodiments of the present invention, the apparatuses, methods, and systems involve receiving a bidded term from an advertiser participating in an online auction, determining a market reserve price for the term using an adaptive learning algorithm wherein the parameters of the adaptive learning algorithm have been determined by a stochastic optimization process, and outputting the market reserve price for display.

The following detailed description together with the accompanying drawings will provide a better understanding of the nature and advantages of various embodiments of the present invention.

DESCRIPTION OF EXAMPLE EMBODIMENT(S)

The following example embodiments and their aspects are described and illustrated in conjunction with apparatuses, methods, and systems which are meant to be illustrative examples, not limiting in scope.

A. Network Implementation

Figure 1:
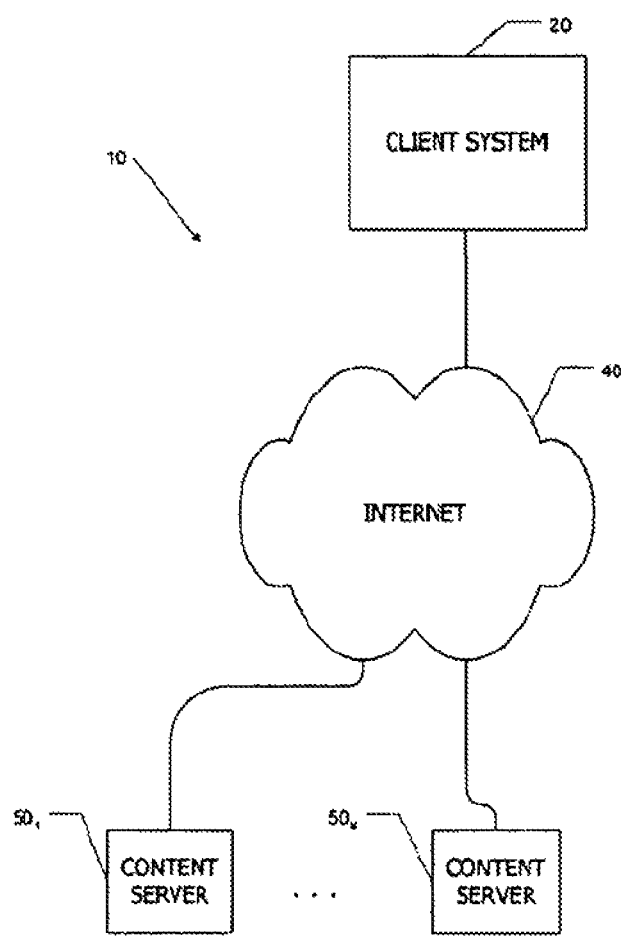
FIG. 1 is a diagram showing an example communication network, which network may be used with an embodiment of the present invention.

FIG. 1 illustrates a general overview of a communication network 10 including a client system 20 and a number of servers $50_1$ to $50_N$ according to one particular embodiment of the present invention. In computer network 10, client system 20 is coupled through the Internet 40, or other communication network, e.g., over any local area network (LAN) or wide area network (WAN) connection, to any number of servers $50_1$ to $50_N$. As will be described herein, client system 20 is configured according to the present invention to communicate with any of servers $50_1$ to $50_N$, e.g., to access, receive, retrieve and/or display web pages, text or graphical advertisements, and other information such as audio or video media content. More particularly, an advertiser may participate in an online keyword auction from a Web browser running on client system 20, which communicates with any of servers $50_1$ to $50_N$ to retrieve market reserve prices and accept or decline the advertiser's bids. A user may submit a query to an Internet search engine from a Web browser running on client system 20, which communicates with any of servers $50_1$ to $50_N$ to retrieve search results and advertisements.

As FIG. 1 illustrates, particular embodiments may operate in a network environment including a plurality of hosts and other distributed systems. For example, client system 20 could include a desktop personal computer, workstation, laptop, personal digital assistant (PDA), cell phone, or any WAP (Wireless Application Protocol)-enabled device or any other computing device capable of interfacing directly or indirectly to the Internet. Client system 20 typically runs a browsing program, such as Microsoft's Internet Explorer™ browser, Netscape Navigator™ browser, Mozilla Firefox™ browser, Opera™ browser, or a WAP-enabled browser in the case of a cell phone, PDA or other wireless device, or the like, allowing a user of client system 20 to process and view information and web pages available to it from servers $50_1$ to $50_N$ over Internet 40.

Client system 20 also typically includes one or more user interface devices for interacting with a graphical user interface (GUI) provided by the browser on a display (e.g., monitor screen, LCD display, etc.), in conjunction with pages, forms and other information provided by servers $50_1$ to $50_1$ or other servers. The present invention is suitable for use with the Internet, which refers to a specific global network of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components, any of the servers $50_1$ to $50_N$ and all of its components, are configurable and made operative using an application including computer code run using a central processing unit such as an Intel x86-compatible microprocessor, an AMD x86-compatible microprocessor, or the like or multiple microprocessors. Computer code for configuring and operating client system 20 to communicate, process and display data and media content as described herein may be downloaded and stored on a hard disk, but the entire program code, or portions thereof, may also be stored in any other volatile or non-volatile memory medium or device such as a ROM or RAM, or provided on any media capable of storing program code, such as a compact disk (CD) medium, a digital video disk (DVD) medium, a floppy disk, and the like. Additionally, the entire program code, or portions thereof, may be transmitted and downloaded from a software source, e.g., from one of servers $50_1$ to $50_N$ to client system 20 over the Internet, or transmitted over any other network connection (e.g., extranet, VPN, LAN, or other conventional networks) using any communication medium and protocol (e.g., TCP/IP, HTTP, HTTPS, Ethernet, or other conventional media and protocol).

It should be appreciated that computer code for implementing embodiments of the present invention can be C, C++, HTML, XML, Java, etc., or any suitable scripting language, e.g., VBScript, JavaScript, or any other suitable programming language that can be executed on any of servers $50_1$ to $50_N$ or client system 20, or compiled to execute on any of servers $50_1$ to $50_N$ or client system 20. In some embodiments, needed code is embedded in a web page and sent to client system 20 and executed, or code already present at servers $50_1$ to $50_N$ and client system 20 is executed.

B. Computing Client or Server Architecture

Figure 2:
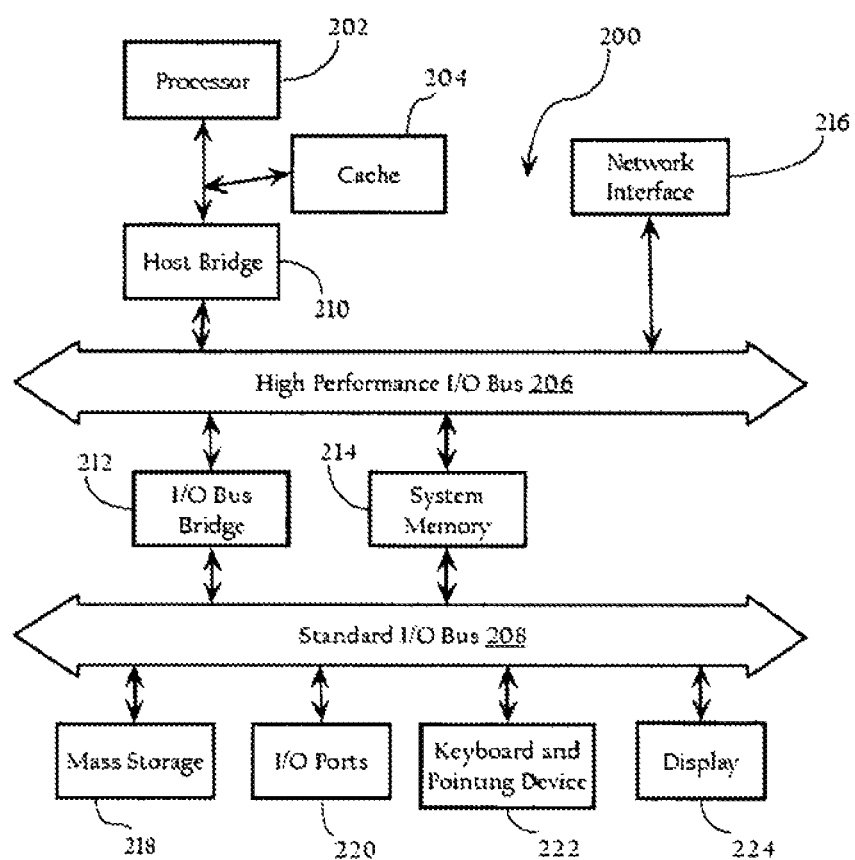
FIG. 2 is a diagram showing an example system architecture for a client system or a server, which may be used by an embodiment of the present invention.

FIG. 2 illustrates, for didactic purposes, a hardware system 200, which may be used to implement a server or a client system. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one embodiment, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, I/O devices, or memories.

In one embodiment, the optimization process and the auction simulations described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Vista operating system, available from Microsoft Corporation of Redmond, Wash., the Apple Macintosh Operating System, available from Apple Computer Inc. of Cupertino, Calif., and the like.

C. Optimization of Parameters of Adaptive Learning Algorithm

Figure 3:
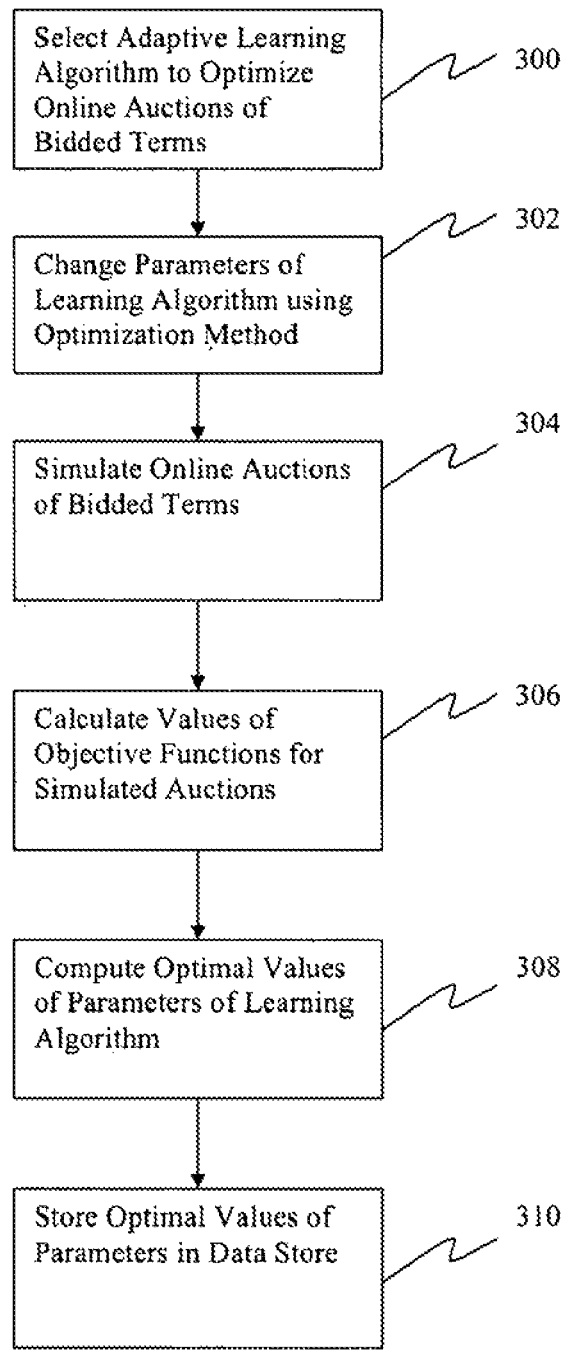
FIG. 3 is a diagram showing a flowchart of the example process used for determining optimal learning parameters of an adaptive learning algorithm to maximize an objective function of one or more online auctions of one or more bidded terms.

FIG. 3 illustrates an example process used for determining optimal learning parameters of an adaptive learning algorithm for online keyword auctions. The adaptive learning algorithm is used to select auction parameters to maximize an objective function. In the first step 300, the embodiment accesses an adaptive learning algorithm with one or more learning parameters. In some embodiments, a type of adaptive learning algorithm called softmax action selection is used. Auction parameters such as the market reserve price of a bidded term are determined by the softmax action selection algorithm to maximize an objective function such as an overall estimated revenue from the online keyword auctions. In this approach, an auctioneer may choose one of k choices for the market reserve price at each step, wherein the i th choice is a price of $(i-1)/(k-1)$. Each choice is assumed to be independent. There is a tradeoff between exploring the choice to increase knowledge of each choice's result, and exploiting the choice currently believed to be best. The average revenue for each choice of market reserve price, $avg_i$, is recorded, and at each step the probability of choosing i is $(e^{avg_i/\tau})\Sigma_{j=1}^{k} e^{avg_j/\tau}$, where $\tau$ represents a temperature determining the extent to which exploitation trumps exploration. The temperature is often lowered over time to favor increasing exploitation due to the fact that estimates of the result of each choice improve in accuracy with experience. The two learning parameters, k and $\tau$, control the selection of a market reserve price and an estimated revenue.

To determine optimal values of the learning parameters such as k and $\tau$, an embodiment uses a stochastic optimization method in step 302. In some embodiments, a stochastic optimization method based on gradient approximation called the Simultaneous Perturbation Stochastic Approximation (SPSA) is used. At each step, two estimates of the expected revenues are taken for slight perturbation of the current parameters, a gradient approximation is found, and the parameters are updated in the direction of the gradient.

For a given set of parameters such as k and $\tau$, the embodiment simulates online auctions and estimates the revenue in step 304. In some embodiments, one or more bidders and their bids are generated for each bidded term without making any assumptions about the bidders in terms of their value distributions for the bidded terms and their rationality. To simulate bidder behavior, the embodiment specifies a probability distribution over bidder populations, and draws a population from this distribution for each auction to be simulated. In essence, the simulations adapt to a variety of bidder populations. The probability distribution may be any distribution as long as the distribution is able to generate experience with a variety of different representative bidder populations.

For a bidded term comprising one or more keywords, each bidder has a value distribution for the bidded term, i.e., a minimum value $v_{min}$ and a maximum value $v_{max}$. Each bidder also has a loss averse factor $\alpha$. A loss averse bidder with a loss averse factor $\alpha$ considers that it is "losing" an item when it was the high bidder at one time during the bidding process but was later outbid. Such a loss averse bidder may subsequently bid more aggressively. In one embodiment, to simulate n auctions for a bidded term, the embodiment randomly generates an arbitrary value distribution for a bidded term by taking a Gaussian with a mean chosen uniformly from [0,1] and a variance of $10^x$ with x chosen uniformly from $[-2,1]$, and then normalizes the distribution so that the portion over the range [0,1] represents a probability distribution function. The loss aversion factor $\alpha$ is generated in the same way, choosing variance as before and using a range of [1,2.5] for both the mean and the entire distribution.

For each simulated auction, two values from the value distribution are drawn and assigned to two simulated bidders respectively, and a single loss aversion factor $\alpha$ is drawn from the loss aversion distribution. One of the simulated bidders is selected as an initial bidder. The second bidder responds by submitting an incremental bid above the current bid only if $\int_r^{v_2}(v_2-\alpha v_1)f(v_1)dv_1>0$, where r is the market reserve price, $v_2$ is, the second bidder's valuation of the bidded term, and $f$ is the known distribution function over valuations. The second bidder will bid up to a times his valuation, and then drop out of the auction.

In step 306, the embodiment calculates values of the objective function for the auctions. In some embodiments, the objective function is an overall estimated revenue from the auctions of the one or more bidded terms over a period of time. For each simulated auction, a winning bid will emerge based on the simulated bidders' value distributions and the loss aversion factors. An overall estimated revenue may be calculated by aggregating the expected revenues resulting from the winning bids in the simulated auctions over the period of time.

In step 308, the embodiment determines optimal values of the learning parameters of the adaptive learning algorithm. In some embodiments, the learning parameters k and $\tau$ are updated using the SPSA algorithm, and n number of auctions are simulated to derive a market reserve price for each bidded term so that the overall estimated revenue is maximized. For each set of learning parameters k and $\tau$, a maximum overall estimated revenue is derived from the simulations. The SPSA algorithm determines the optimal values of k and $\tau$ that maximizes the overall estimated revenue.

In step 310, the embodiment stores information related to the optimization process to a data store. In some embodiments, the data store is a database management system such as the MySQL, the Oracle, or the SQL Server database management systems. Information related to the optimization process comprises the selected adaptive learning algorithm, the optimal learning parameters of the adaptive learning algorithm, the optimization algorithm that is used to find the optimal values of the learning parameters, the distribution that is used to draw value distributions of bidders in the simulated auctions, the distribution that is used to draw loss aversion factors of bidders, and the overall estimated revenue.

Figure 4:
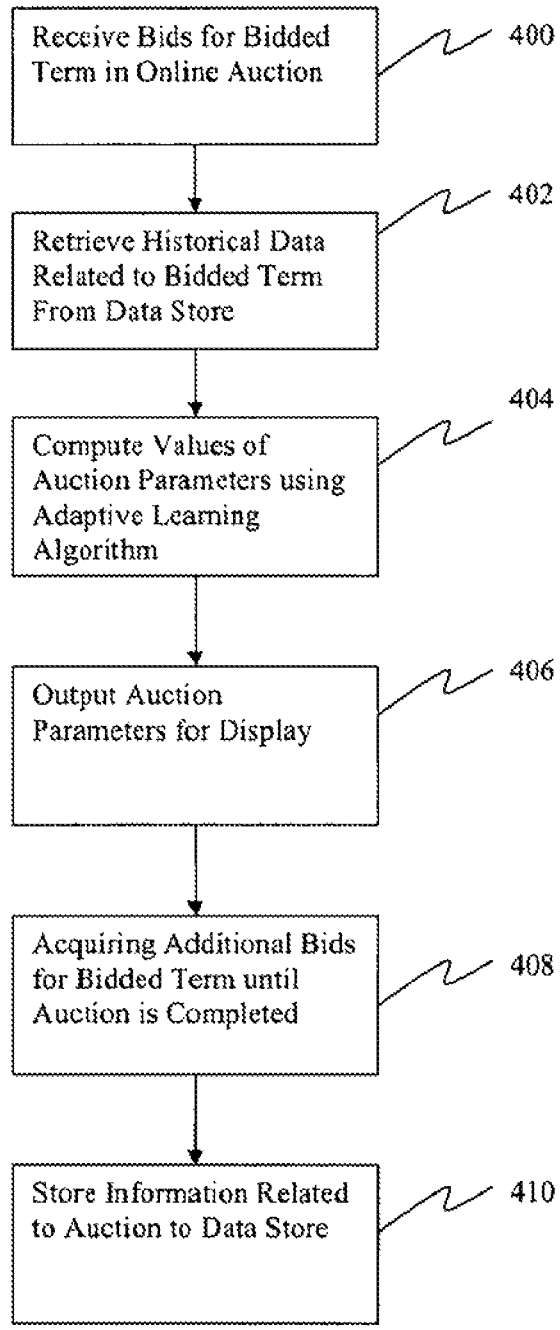
FIG. 4 is a diagram showing a flowchart of example process used for determining a market reserve price of a bidded term using an adaptive algorithm with optimal parameters determined by simulated auctions that maximizes an objective function.

FIG. 4 illustrates an example process used to determine a market reserve price for a bidded term in auctions in an online keyword auction platform such as the Google AdWords platform, the Yahoo! Search Marketing platform, or the Microsoft AdCenter platform.

In the first step 400, the embodiment receives one or more bids for a bidded term. In some embodiments, the bids for a bidded term arrive at the same time. In other embodiments, the bids for the bidded term may arrive within a time period ranging from a few milliseconds to a few minutes.

In step 402, the embodiment retrieves historical data related to the bidded term from a data store. In some embodiments, the historical data comprises information related to past auctions of the bidded term comprising the market reserve prices of the bidded term, the number of bidders and their bids, the duration of the auctions, and the winning bids. In some embodiments, no information related to the bidded term is found in the data store. The embodiment may select a default market reserve price or use a market reserve price of a related bidded term for which historical information is available.

In step 404, the embodiment computes values of one or more auction parameters using an adaptive learning algorithm. In some embodiments, the auction parameters comprise a market reserve price for the bidded term. In other embodiments, the auction parameters comprise a market reserve price for the bidded term and a time duration for the auction. In some embodiments, the adaptive learning algorithm comprises the softmax action selection algorithm. Auction parameters such as the market reserve price of a bidded term are determined by the softmax action selection algorithm to maximize an objective function such as an overall estimated revenue from the online keyword auctions. In this approach, an auctioneer may choose one of $\kappa$ choices for the market reserve price at each step, wherein the i the choice is a price of $(i-1)/(k-1)$. The average revenue for each choice of market reserve price, $avg_i$, is recorded, and at each step the probability of choosing i is $(e^{avg_i/\tau})/\Sigma_{j=1}^k e^{avg_j/\tau}$, where $\tau$ represents a temperature determining the extent to which exploitation trumps exploration. The two learning parameters, k and $\tau$, controls the selection of a market reserve price and an estimated revenue. The optimal values of k and $\tau$ are determined by an optimization process such as the SPSA method in simulated auctions.

In some embodiments, once the optimal market reserve price is computed using an adaptive learning algorithm such as the softmax action selection algorithm with optimized learning parameters k and $\tau$, a comparison is made between the computed market reserve price and the received bids for the bidded term. Bids lower than the market reserve prices are excluded. For the remaining bids, a winning bid is determined based on the type of auction. If every received bid is below the market reserve price, the embodiment outputs the market reserve price for display to the bidders in step 406. The embodiment may receive additional bids for the bidded term from one or more bidders and determine a winning bid from the additional bids. If the embodiment does not receive any additional bids until the end of the auction, there will be no winning bid.

In step 410, the embodiment stores information related to the current auction in the same data store from which the embodiment retrieves historical data in step 402. In some embodiments, the information comprises the bidded term, the received bids, the computed market reserve price for the bidded term, the additional bids after outputting the market reserve price for display, and the winning bid if any.

Figure 5:
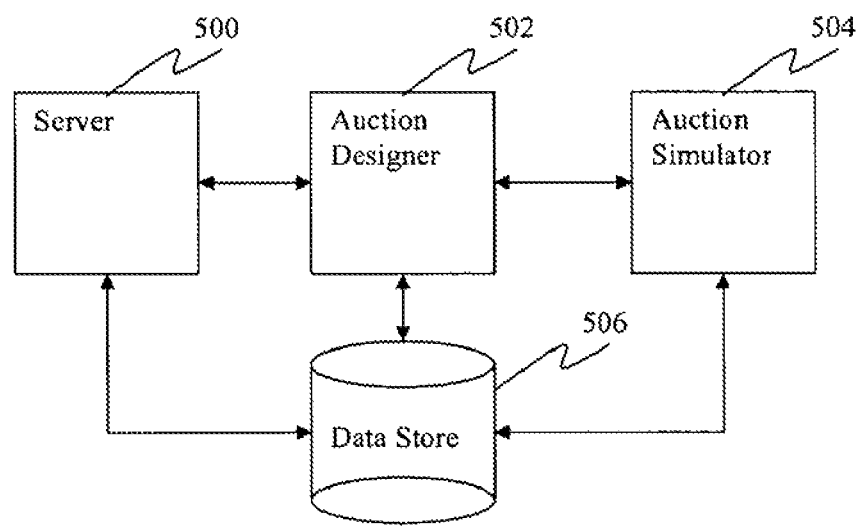
FIG. 5 is a diagram showing an example system architecture for a server system, which may be used by an embodiment of the present invention to determine optimal learning parameters of an adaptive learning algorithm to maximize an objective function of online keyword auctions.

FIG. 5 illustrates an example system architecture for a server system, which may be used by an embodiment of the present invention to simulate keyword auctions and to determine optimal learning parameters of an adaptive learning algorithm to maximize an objective function of online keyword auctions.

Server 500, auction designer 502, and auction simulator 504 comprise a central processing unit such as an Intel x86-compatible microprocessor, an AMD x86-compatible microprocessor, or the like or multiple microprocessors. In some embodiments, data store 506 may be coupled with server 500 and comprise volatile or non-volatile memory medium or device such as a ROM or RAM, or any media capable of storing program code, such as a compact disk (CD) medium, a digital video disk (DVD) medium, a floppy disk, and the like. In other embodiments, data store 506 may be a standalone filer such as a NetApp filer system.

Server 500 runs computer code that implements a stochastic optimization algorithm such as the SPSA algorithm. Data store 504 stores historical information about past auctions, simulation auctions, and information related to the auction such as market reserve prices, number and amount of bids, and the winning bids. Auction designer 502 selects auction parameters using an adaptive learning algorithm as described above. Auction simulator 504 generates bidders and bids to simulate online auctions as described above.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. For example, a large parallel and distributed computing platform may be used to simulate online keyword auctions and to optimize the learning parameters of an adaptive learning algorithm. It is therefore not intended that the present invention be limited, except as indicated by the appended claims.

What is claimed is:

1. A method, implemented on a machine having at least one processor, storage, and a communication platform connected to a network, comprising the steps of:
   receiving, via the communication platform, one or more bids for a bidded term comprising one or more keywords from one or more bidders in an auction, wherein said auction occurs in an online auction platform;
   retrieving data from a data store operatively couple to the online auction platform wherein the data comprises values of one or more auction parameters related to past auctions of the bidded term;
   computing, by the at least one processor, updated values of the one or more auction parameters based on the retrieved data using an adaptive learning algorithm;
   acquiring a winning bid based on the computed auction parameters; and
   storing the bidded term, the one or more bids, the updated values of the auction parameters, and the: winning bid in the data store.

2. The method of claim 1, wherein the auction parameters comprise a market reserve price for the bidded term and the acquiring step comprising:
   excluding bids which are below the market reserve price;
   selecting a winning bid from the remaining bids; and
   acquiring additional bids if all bids are excluded in the exclusion step, the step of acquiring additional bids comprising:
      outputting the updated values of the auction parameters for display; and
      receiving zero or more additional bids for the bidded term until the auction is completed.

3. The method of claim 1, wherein the one or more auction parameters comprise market reserve prices of the bidded term and durations of the auctions.

4. The method of claim 1, wherein the adaptive learning algorithm comprises one or more learning parameters optimized by a stochastic optimization method in simulated auctions using historical data.

5. The method of claim 1, wherein the adaptive learning algorithm comprises the softmax action selection process.

6. The method of claim 4, wherein the stochastic optimization method comprises the simultaneous perturbation stochastic approximation process.

7. An apparatus, comprising:
   a memory;
   one or more processors; and
   logic encoded in one or more computer readable medium, wherein the logic when executed is operable to use the one or more processors to;
      receive one or more bids for a bidded term comprising one or more keywords from one or more bidders in an auction, said auction occurs in an online auction platform;
      retrieve data from a data store operatively coupled to the online auction platform wherein the data comprises values of one or more auction parameters and one or more bids related to past auctions of the bidded term;
      compute updated values of the one or more auction parameters based on the retrieved data using an adaptive learning algorithm;
      output the updated values of the auction parameters for display;
      acquire zero or more additional bids for the bidded term until the auction is completed; and
      store the bidded term, the one or more bids, the updated values of the auction parameters, and the acquired additional bids in the data store.

8. The apparatus of claim 7, wherein the one or more auction parameters comprise market reserve prices of the bidded term and durations of the auctions.

9. The apparatus of claim 7, wherein the adaptive learning algorithm comprises one or more learning parameters optimized by a stochastic optimization method in simulated auctions using historical data.

10. The apparatus of claim 7, wherein the adaptive learning algorithm comprises the softmax action selection process.

11. The apparatus of claim 9, wherein the stochastic optimization method comprises the simultaneous perturbation stochastic approximation process.

* * * * *